(12) United States Patent
Stanton

(10) Patent No.: US 12,317,871 B1
(45) Date of Patent: Jun. 3, 2025

(54) BEE VACUUM

(71) Applicant: Michael Stanton, Poway, CA (US)

(72) Inventor: Michael Stanton, Poway, CA (US)

( * ) Notice: Subject to any disclaimer, the term of this patent is extended or adjusted under 35 U.S.C. 154(b) by 0 days.

(21) Appl. No.: 18/214,944

(22) Filed: Jun. 27, 2023

(51) Int. Cl.
*A01K 57/00* (2006.01)

(52) U.S. Cl.
CPC .................................. *A01K 57/00* (2013.01)

(58) Field of Classification Search
CPC ........ A01K 57/00; A01K 51/00; A01K 55/00; A01M 3/005; A01M 1/06; A01M 5/08; A01M 1/10
USPC .................................................... 43/139, 140
See application file for complete search history.

(56) References Cited

U.S. PATENT DOCUMENTS

| | | | | |
|---|---|---|---|---|
| 1,463,583 | A * | 7/1923 | Holleran | A47L 5/14 15/345 |
| 2,829,384 | A | 4/1958 | Studler | |
| 3,750,327 | A * | 8/1973 | Thybault | A01M 1/06 43/139 |
| 4,288,880 | A | 9/1981 | Gary et al. | |
| 4,979,330 | A * | 12/1990 | Rorant | A01M 1/06 55/367 |
| 5,052,147 | A * | 10/1991 | Broomfield | A01M 3/005 43/139 |
| 5,367,821 | A * | 11/1994 | Ott | A01M 3/005 43/134 |
| 5,400,543 | A * | 3/1995 | Ideker, Jr. | A01M 5/08 134/21 |
| 5,575,703 | A | 11/1996 | Stearns | |
| 6,226,919 | B1 * | 5/2001 | Septer | A01M 1/06 43/139 |
| 6,637,149 | B1 | 10/2003 | Bauer | |
| 7,757,432 | B2 | 7/2010 | Gunderman, Jr. | |
| 9,930,869 | B2 | 4/2018 | Linder et al. | |
| 11,160,212 | B2 | 11/2021 | Hess | |
| 11,227,163 | B2 | 1/2022 | Werner et al. | |
| 2009/0068926 | A1 * | 3/2009 | Venglar | A01K 57/00 449/20 |
| 2012/0058708 | A1 * | 3/2012 | Nenninger | A01K 57/00 449/61 |

(Continued)

OTHER PUBLICATIONS

Better Bee Vacuum. Video [online]. Youtube.com Michael Taylor [retrieved on Aug. 12, 2022]. Retrieved from the Internet:<URL: https://www.youtube.com/watch?v=vLnbynzHhR0>.

(Continued)

*Primary Examiner* — Joshua J Michener
*Assistant Examiner* — Nicole Paige MacCrate
(74) *Attorney, Agent, or Firm* — Cramer Patent & Design, PLLC.; Aaron R. Cramer

(57) ABSTRACT

The bee vacuum may comprise a first bucket, a second bucket, a lid, an intake hose, a vacuum pump, and a battery pack. The bee vacuum may be adapted to collect a plurality of bees from a swarm so that the swarm may be relocated. The vacuum pump located in the bottom of the first bucket be energized by the battery pack to drawn air and the plurality of bees into the second bucket via the intake hose. The second bucket may be smaller than the first bucket and may be nested within the top of the first bucket. The air may pass through a plurality of air apertures in the second bucket to reach the vacuum pump, leaving the plurality of bees in the second bucket.

1 Claim, 5 Drawing Sheets

(56) References Cited

U.S. PATENT DOCUMENTS

2012/0137569 A1\* 6/2012 Younts .................. A01M 3/005
                                                        43/139
2018/0288993 A1\* 10/2018 Focks ..................... A01M 1/06
2021/0235665 A1\* 8/2021 Brown ..................... B65D 1/02

OTHER PUBLICATIONS

Basic Model: Gen 2.5 Everything Bee Vacuum. Video [online]. All My Bees [retrieved on Aug. 12, 2022]. Retrieved from the Internet:<URL: https://www.allmybees.com/store/p8/Basic_Model:_Gen_2.5_Everything_Bee_Vacuum.html>.

\* cited by examiner

BEE VACUUM

RELATED APPLICATIONS

None.

FIELD OF THE DEVICE

The present device relates generally to a vacuum and more specifically to a vacuum for bees and/or honeybees.

BACKGROUND OF THE DEVICE

A large number of people over the globe take pleasure in beekeeping as a pastime, a profession, or all three. Not only is it a calm and relaxing employment, but it also results in the production of honey and honeycomb, both of which have the potential to result in financial gain. Having said that, in order to really enjoy this hobby, it is frequently necessary to totally remove all of the bees from a hive so that they can be moved to another colony.

This is also important when trapping wild bees that need to be removed from a house, tree, or other structure where they are causing problems for people. A significant number of beekeepers resort to the utilization of specialized vacuums that have the look of standard shop vacuums in order to collect, hold, and move the bees to their new site. These kind of vacuums are incredibly effective at completing this work; however, in order for them to function, they require AC power. One might easily assume that there are bees in numerous locations where there is limited access to AC power. As a consequence of this, there is a demand for a method through which a bee vacuum can function even in the absence of alternating current (AC) power. This requirement has been met with the development of the bee vacuum.

SUMMARY OF THE DEVICE

A bee vacuum device that has a first bucket is one example of how the current disclosure can be implemented. A second bucket might also be included in some embodiments. Embodiments may also feature a lid. In some implementations, an input hose is also included. In some implementations, there is also a vacuum pump that is equipped with both an electric motor and a device that moves air.

A battery pack that is in electrical connection with the vacuum pump is another component that may be included in embodiments. It is possible that the battery pack will provide the power necessary to operate the vacuum pump, which will then suck air and a number of bees into the second bucket through the intake hose. It's possible that the vacuum pump can be made to work so that it can draw air through the bee vacuum in some implementations.

The second bucket may be smaller than the first bucket and may be nested within a top of the first bucket in certain implementations. This configuration makes it possible for air to travel through a plurality of air apertures in the second bucket and reach the vacuum pump, while still keeping the plurality of bees contained within the second bucket. A power switch might be the one to operate the electric motor in certain implementations of the design.

In certain implementations, the first bucket is a container with an open top and a circular footprint. This configuration allows the vacuum pump and the battery pack to be stored within a section of the bottom of the first bucket. It's possible that the vacuum pump and the battery pack could be detached from the first bucket in certain implementations.

The bee vacuum may, in some implementations, be designed to capture a plurality of bees for the purpose of relocating them.

In some embodiments, a seal may be applied to the top of an interior side wall of the first bucket. This creates an airtight coupling between the first bucket and the second bucket after the second bucket is in position. In other embodiments, a seal may be applied to the top of an exterior side wall of the first bucket.

In certain implementations, the seal could be constructed out of plumber's felt. It is possible for the first bucket to incorporate a battery bay in certain implementations. This would have the effect of shortening the distance that the battery pack protrudes from the first bucket while ensuring that the first bucket remained airtight.

A first handle that is designed to be easily gripped by a user in order to facilitate movement may be included on the first bucket in some embodiments. It is possible that the second bucket is an open-top container with a circular footprint and that it is sized to fit within the top of the first bucket. It is possible that it is supported by side walls, which prevents it from collapsing into the first bucket. In certain implementations, the first bucket is sized to accommodate the second bucket.

The first bucket in some implementations has a capacity of five gallons, while the second bucket has a capacity of two to two and a half gallons. This configuration defines a first cavity and a second cavity, with the plurality of bees being contained to the first cavity.

The second bucket may, in some implementations, include a number of air apertures that are dispersed across the bottom of the second bucket and the lower one-third of the side wall of the second bucket. These air apertures enable a quantity of air to pass from the first cavity into the second cavity while simultaneously preventing the plurality of bees from passing through the apertures. It is possible that the air will be drawn along a path that starts at the intake hose, continues through a first cavity and a second cavity, and finally exits the bee vacuum through an air exhaust that is situated within the first bucket adjacent to the first bucket base. This is one example of how the air may be drawn in some implementations.

In some implementations, the diameter of each of the many air apertures is equal to one eight hundredth of an inch. It is possible that certain implementations of the second bucket will incorporate a second handle that is designed to be grasped by a user in order to make it simpler to remove the second bucket from the first bucket.

In certain implementations, the lid may feature a bee intake hole and detachably couple to the top of the second bucket. Additionally, the bee intake aperture may be enclosed by a hose coupler. In certain implementations, the hose coupler and the intake hose are designed to be detachable from one another. This enables the plurality of bees to be drawn through the intake hose and into a first cavity within the second bucket via the bee intake aperture.

It is possible that the intake hose can be detached from the hose coupler in certain embodiments. In these embodiments, an intake cap is placed over the hose coupler in order to keep the plurality of bees contained within the second bucket while it is being transported.

In certain implementations, the intake cap is designed to detachably couple to the hose coupler. In these implementations, the intake cap may feature an intake screen that prevents the plurality of bees from leaving the second bucket but allows air circulation. One-eighth of an inch is the mesh size that is used for the intake screen in some implementations.

In certain implementations, the intake cap can be secured to the lid via a tether so that it cannot be misplaced. In some implementations, the intake hose is a semi-rigid tube with a lid coupler at one end, which allows for a detachable coupling to a hose coupler on the lid, and a free end at the other end, which allows the user to move it such that it is next to the plurality of bees that are to be collected. This allows the user to collect the bees more efficiently. In some implementations, the battery pack can be detached from a battery receiver, and this receiver can be reached through the battery compartment.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
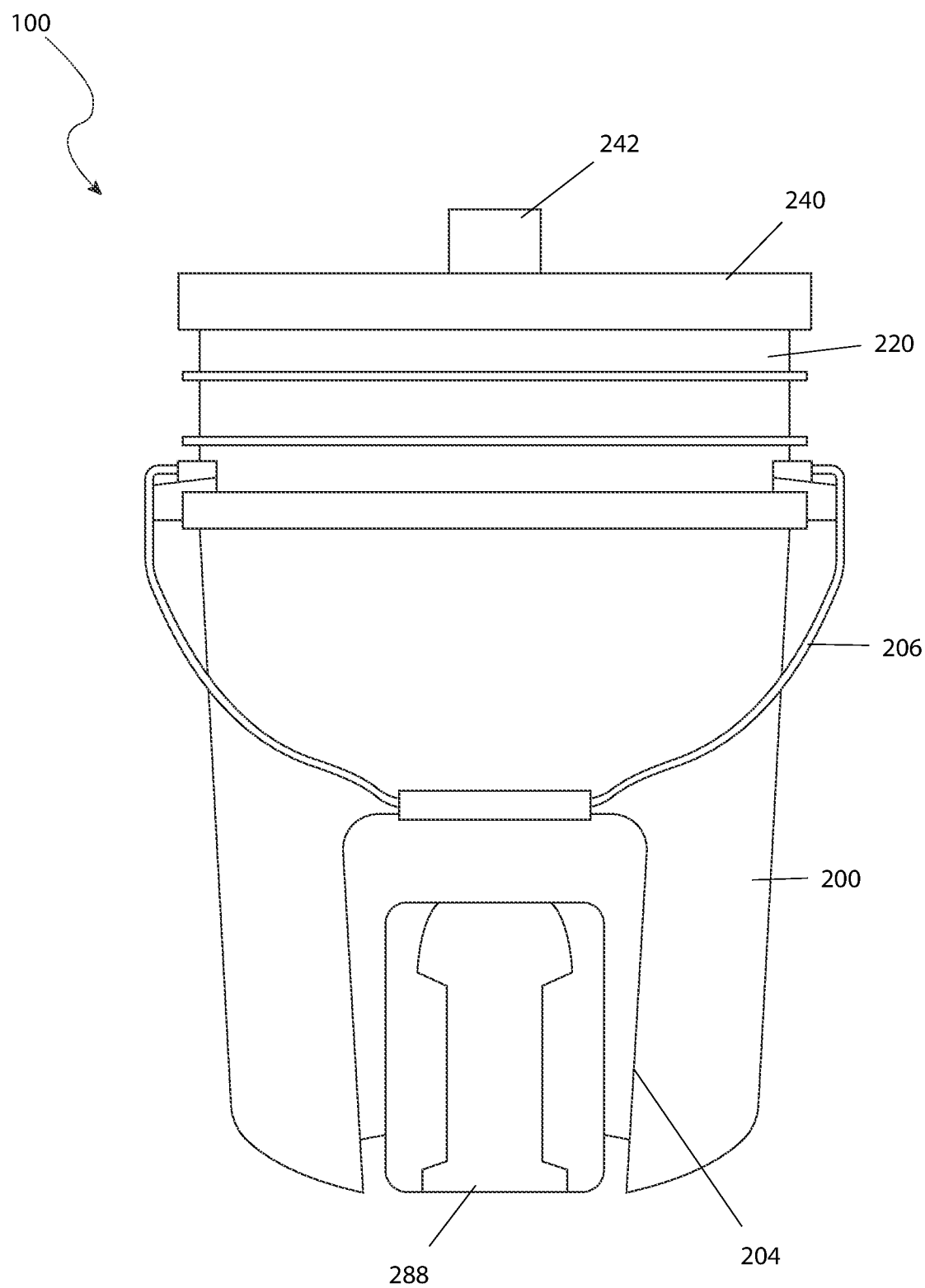
FIG. 1 is a front view of a bee vacuum 100, according to an embodiment of the present device.
Figure 2:
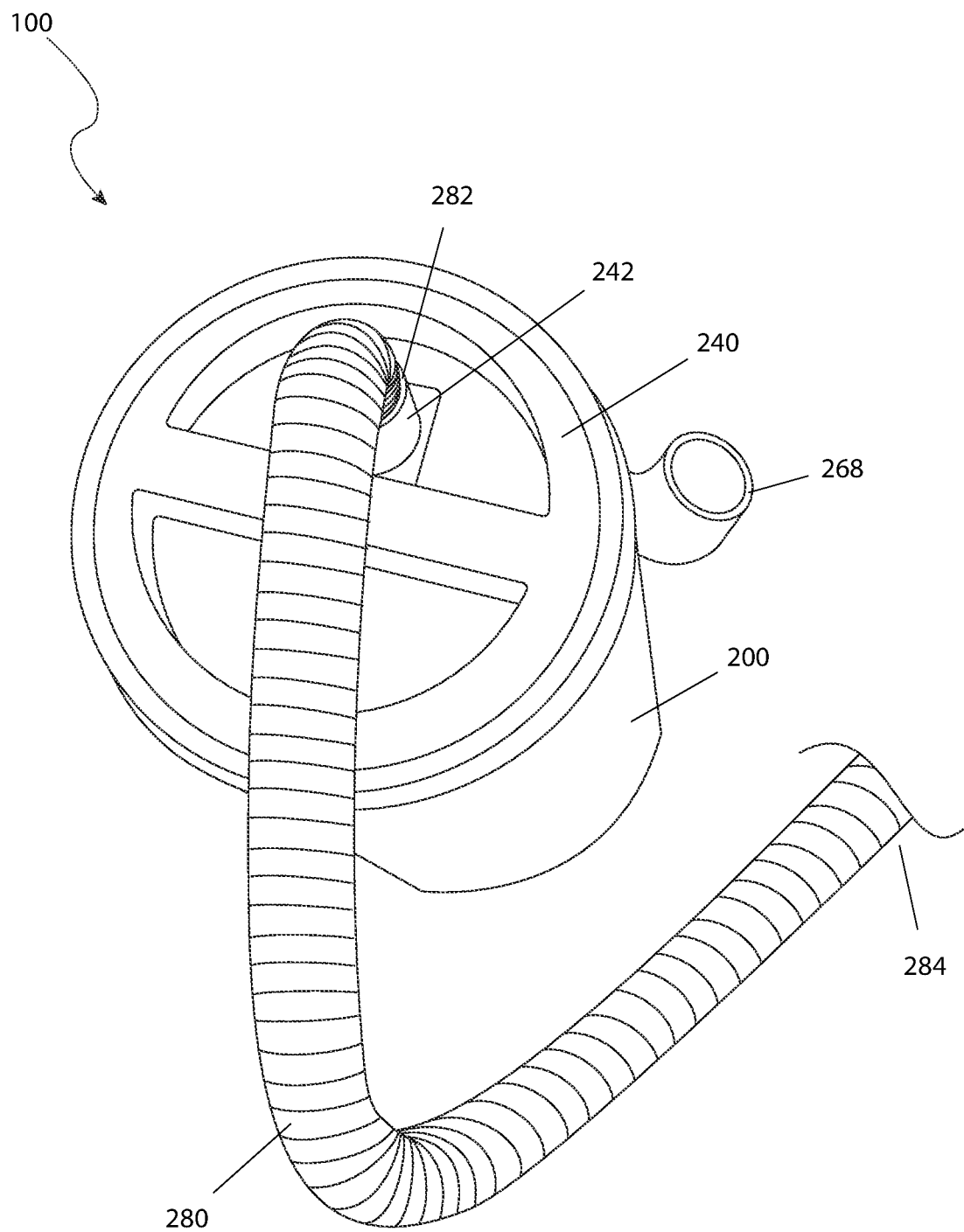
FIG. 2 is an isometric view of a bee vacuum 100, according to an embodiment of the present device.
Figure 3:
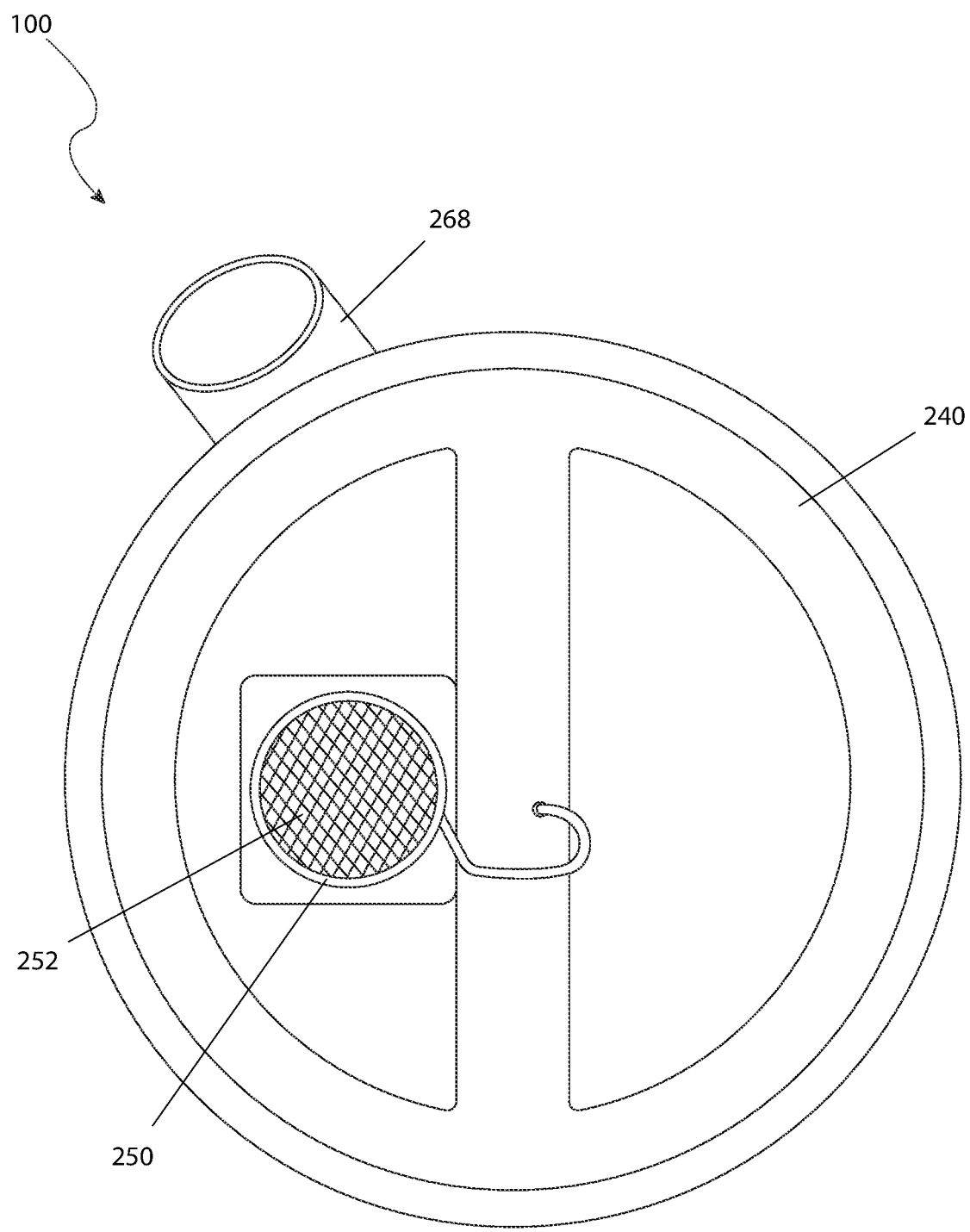
FIG. 3 is a top view of a bee vacuum 100, according to an embodiment of the present device.
Figure 4:
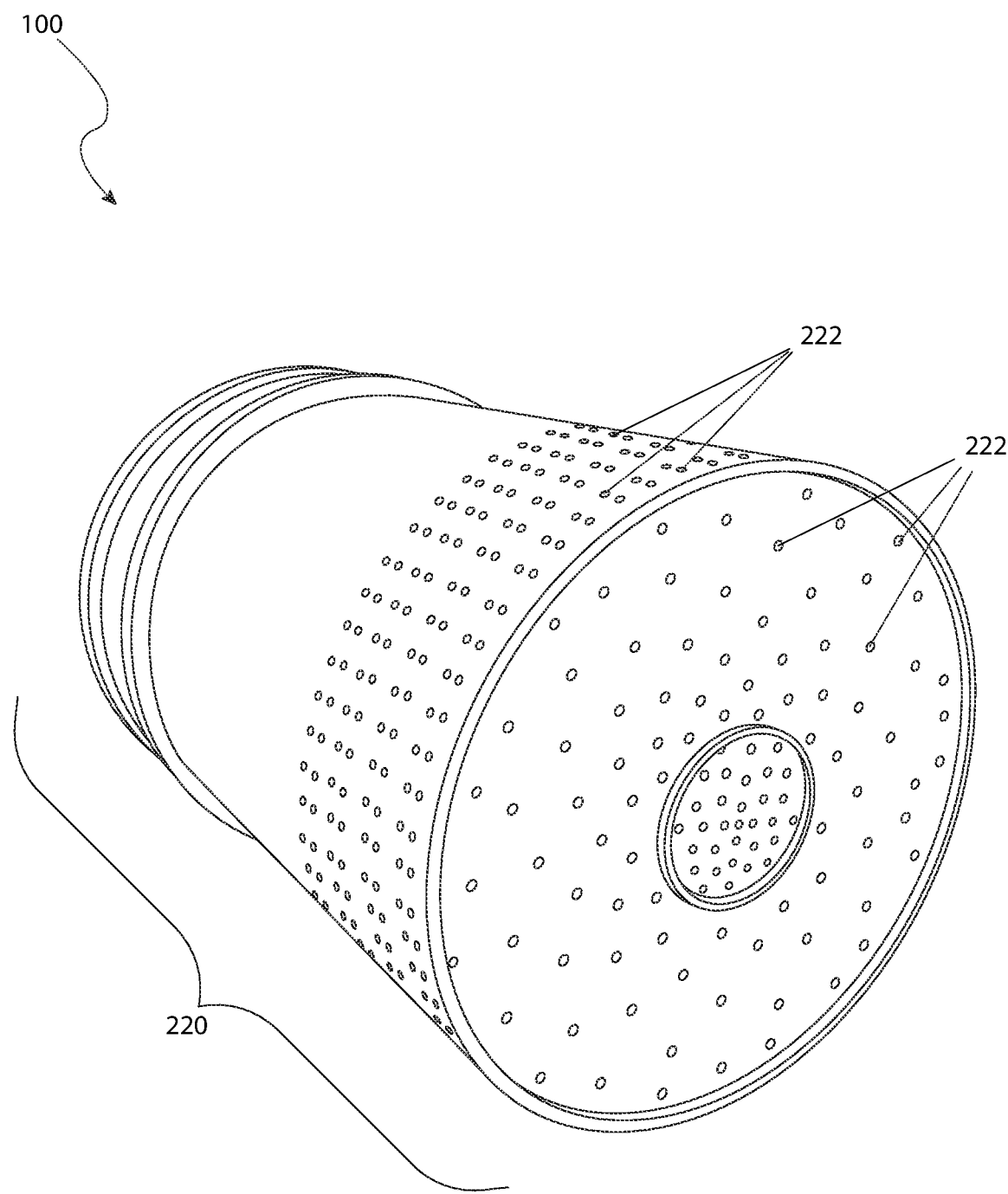
FIG. 4 is an isometric view of a bee vacuum 100, according to an embodiment of the present device, illustrating the second bucket 220.
Figure 5:
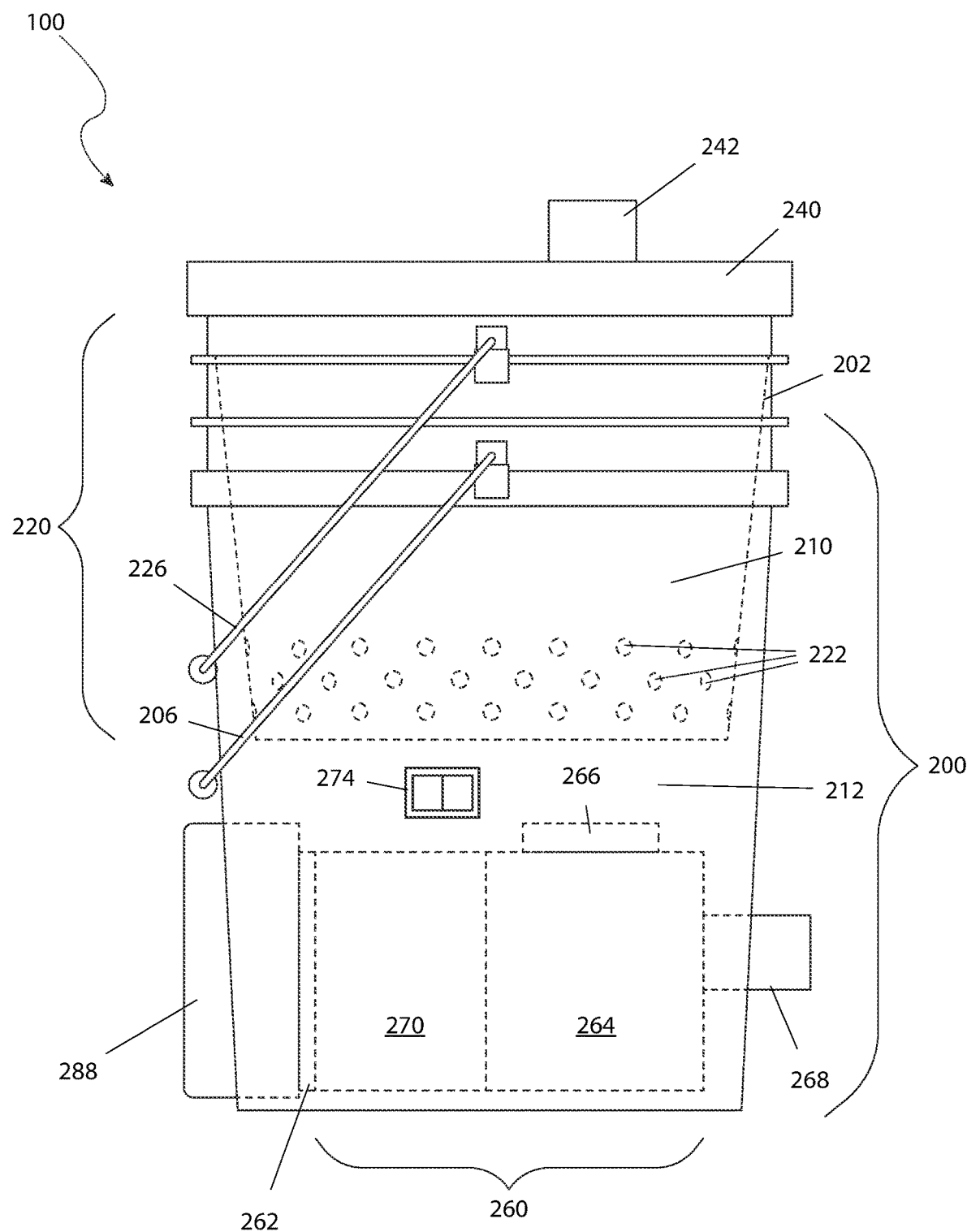
FIG. 5 is a side detail view of a bee vacuum 100, according to an embodiment of the present device.

DESCRIPTIVE KEY 100 bee vacuum
200 first bucket
202 seal
204 battery bay
206 first handle
210 first cavity
212 second cavity
220 second bucket
222 plurality of air apertures
226 second handle
240 lid
242 hose coupler
250 intake cap
252 intake screen
260 vacuum pump
262 battery receiver
264 air moving device
266 air intake
268 air exhaust
270 electric motor
274 power switch
280 intake hose
282 lid coupler
284 free end
288 battery pack

DESCRIPTION OF THE DEVICE

The present device is directed to a bee vacuum (herein sometimes described as the "device") 100. The bee vacuum 100 may comprise a first bucket 200, a second bucket 220, a lid 240, an intake hose 280, a vacuum pump 260, and a battery pack 288. The bee vacuum 100 may be adapted to collect a plurality of bees from a swarm so that the swarm may be relocated. The vacuum pump 260 located in the bottom of the first bucket 200 may be energized by the battery pack 288 to drawn air and the plurality of bees into the second bucket 220 via the intake hose 280. The second bucket 220 may be smaller than the first bucket 200 and may be nested within the top of the first bucket 200. The air may pass through a plurality of air apertures 222 in the second bucket 220 to reach the vacuum pump 260, leaving the plurality of bees in the second bucket 220.

The first bucket 200 may be an open-top container having a circular footprint. The first bucket 200 may house the vacuum pump 260 and the battery pack 288 within the bottom portion of the first bucket 200. The first bucket 200 may comprise a seal 202 applied to the top of the interior side walls of the first bucket 200. The seal 202 may create an airtight coupling between the first bucket 200 and the second bucket 220 when the second bucket 220 is in place at the top of the first bucket 200. As a non-limiting example, the seal 202 may be made from plumber's felt.

The first bucket 200 may comprise a battery bay 204. The battery bay 204 may be an alcove in the bottom side wall of the first bucket 200. The battery bay 204 may reduce the distance that the battery pack 288 extends out of the first bucket 200 by substantially housing the battery pack 288 within the battery bay 204. The battery bay 204 may maintain the integrity of the airtightness of the first bucket 200 such that air is prevented from entering the first bucket 200 via the battery bay 204.

The first bucket 200 may comprise a first handle 206. The first handle 206 may be adapted to be grasped by a user in order to move the first bucket 200.

The second bucket 220 may be an open-top container having a circular footprint. The second bucket 220 may be sized to fit within the top of the first bucket 200 supported by the side walls of the first bucket 200 such that the second bucket 220 is prevented from falling into the first bucket 200. The second bucket 220 may be smaller in capacity than the first bucket 200. In a preferred embodiment, the first bucket 200 may have a capacity of five gallons (5 Gal) and the second bucket 220 may have a capacity of two to two and one-half gallons (2-2½ Gal). The combination of the second bucket 220 nested within the first bucket 200 may define a first cavity 210 and a second cavity 212. The first cavity 210 may be defined by the interior of the second bucket 220. The second cavity 212 may be defined by the interior space of the first bucket 200 that is located beneath the second bucket 220. Air drawn into the bee vacuum 100 may pass first through the first cavity 210 and then into the second cavity 212. The plurality of bees may be confined to the first cavity 210.

The second bucket 220 may comprise the plurality of air apertures 222. The plurality of air apertures 222 may be distributed over the bottom of the second bucket 220 and over the lower one-third (⅓) of the side wall of the second bucket 220. The plurality of air apertures 222 may permit air to pass from the first cavity 210 into the second cavity 212. The plurality of air apertures 222 may have a diameter smaller than the size of any of the plurality of bees to prevent the plurality of bees from passing through the plurality of air apertures 222. In a preferred embodiment, the plurality of air apertures 222 may be one-eighth of an inch (⅛ in.) in diameter.

The second bucket 220 may comprise a second handle 226. The second handle 226 may be adapted to be grasped by the user in order to move the second bucket 220. As a non-limiting example, the second handle 226 may be used to remove the second bucket 220 from the first bucket 200.

The lid 240 may removably couple to the top of the second bucket 220. The lid 240 may comprise a bee intake aperture. The bee intake aperture may be surrounded by a hose coupler 242. The intake hose 280 may removably couple to the hose coupler 242 such that the plurality of bees may be drawn through the intake hose 280 and into the first cavity 210 within the second bucket 220 via the bee intake aperture.

The intake hose 280 may be detached from the hose coupler 242 and the hose coupler 242 may be covered by an intake cap 250 to retain the plurality of bees within the second bucket 220. The second bucket 220 may be removed from the first bucket 200 with the intake cap 250 in place such that the plurality of bees may be relocated and then released into a hive. The intake cap 250 may detachably couple to the hose coupler 242. The intake cap 250 may comprise an intake screen 252 that may prevent the plurality of bees from exiting the second bucket 220 through the bee intake aperture while allowing air to circulate through the second bucket 220 during transport. As a non-limiting example, the intake screen 252 may be a one-eighth of an inch (⅛ in.) mesh. In some embodiments, the intake cap 250 may be tethered to the lid 240 to prevent loss of the intake cap 250.

The intake hose 280 may be a semi-rigid tube for directing the flow of air into the bee vacuum 100. One (1) end of the intake hose 280 may comprise a lid coupler 282 that may detachably couple to the hose coupler 242 on the lid 240. The opposite end of the intake hose 280 may comprise a free end 284 that may be adapted to be moved by the user such that the free end 284 may be placed adjacent to the plurality of bees. The flow of air into the free end 284 and through the intake hose 280 may draw the plurality of bees into the bee vacuum 100. The free end 284 may be moved around until most of the plurality of bees are vacuumed into the bee vacuum 100.

The vacuum pump 260 may be operable to draw air through the bee vacuum 100. Along with the air, the vacuum pump 260 may draw the plurality of bees into the bee vacuum 100. The vacuum pump 260 may draw air along a path that passes through the intake hose 280, through the first cavity 210, through the second cavity 212, and then out of the bee vacuum 100. The vacuum pump 260 may comprise an air moving device 264 and an electric motor 270.

The air moving device 264 may force the movement of air from an air intake 266 to an air exhaust 268. The air intake 266 may be located within the second cavity 212 such that the vacuum pump 260 may draw air through the intake hose 280, through the second bucket 220, and through the first bucket 200. The air exhaust 268 may be located outside of the first bucket 200 and may expel the air outside of the bee vacuum 100. The air moving device 264 may be driven by the electric motor 270. As non-limiting examples, when activated, the electric motor 270 may rotate an impeller, may spin fan blades, may cause reciprocation of a piston, or may move other mechanical parts to force air from the air intake 266 to the air exhaust 268. The electric motor 270 may be energized by the battery pack 288 and controlled by a power switch 274. The battery pack 288 may detachably couple to a battery receiver 262 that is accessible via the battery bay 204 and is electrically coupled to the vacuum pump 260.

The electric motor 270 may convert electrical energy into mechanical energy. The electric motor 270 may cause rotation of the air moving device 264 when the electrical energy is applied to the electric motor 270.

In use, the second bucket 220 may be inserted into the top of the first bucket 200 and the lid 240 may be placed onto the second bucket 220. The intake hose 280 may be coupled to the hose coupler 242 on the lid 240. The battery pack 288 may be coupled to the vacuum pump 260 by inserting the battery pack 288 into the battery bay 204 such that the battery pack 288 electrically couples to the battery receiver 262. The vacuum pump 260 may be energized by moving the power switch 274 to the ON position to energize the electric motor 270.

The air moving device 264, driven by the electric motor 270, may draw air into the air intake 266 and exhaust the air via the air exhaust 268. The air drawn into the air intake 266 may pass into the free end 284 of the intake hose 280 and may travel through the intake hose 280 into the first cavity 210 located within the second bucket 220. The free end 284 of the intake hose 280 may be placed adjacent to a swarm such that a plurality of bees may be drawn into the second bucket 220 with the air. Air may pass through the plurality of air apertures 222 located at the bottom of the second bucket 220, however the plurality of air apertures 222 may be too small to pass the plurality of bees. The plurality of bees may therefore be confined to the interior of the second bucket 220. The air that passes through the plurality of air apertures 222 may enter the second cavity 212 located at the bottom of the first bucket 200 and may then pass into the air intake 266.

Once the swarm has been collected, the vacuum pump 260 may be turned off. The intake hose 280 may be decoupled from the lid 240 and the intake cap 250 may be placed onto the hose coupler 242 to prevent the plurality of bees from exiting the second bucket 220. The second bucket 220 may be removed from the first bucket 200 and moved to a different location. As a non-limiting example, the swarm may be transported in the second bucket 220 to a hive and released into the hive.

The exact specifications, materials used, and method of use of the bee vacuum 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A bee vacuum consisting of:
    a first bucket having a circular footprint, a bottom portion housing a vacuum pump and a battery pack, an annular seal disposed at an upper end of interior side walls of the first bucket, the first bucket further having a battery bay formed in a bottom side wall thereof, the battery bay configured to house and electrically couple the battery pack;
    a second bucket removably nested within and supported by the first bucket, the second bucket having a smaller diameter and volume than the first bucket, and consisting of:
        an open top adapted to be covered by a lid; and,
        a plurality of apertures disposed exclusively through a bottom and lower one-third of side walls of the second bucket, wherein the apertures are smaller in diameter than bees to prevent passage therethrough;

a lid removably coupled solely to the open top of the second bucket, said lid consisting of:

a single bee intake aperture; and, a hose coupler surrounding said single bee intake aperture, adapted for attachment of an intake hose;

an intake hose having a first end detachably coupled to said hose coupler on the lid and a second free end adapted to be placed adjacent bees for collection;

a vacuum pump disposed entirely within a bottom portion of the first bucket beneath the second bucket, and operable to draw air through the intake hose and into the second bucket, thereby confining bees in the second bucket; and the battery pack located within said battery bay, said battery pack energizing said vacuum pump; and, wherein air drawn through the intake hose passes through apertures of the second bucket and exits the bee vacuum via the vacuum pump, thereby trapping bees within the second bucket.

* * * * *